United States Patent [19]

Coppin et al.

[11] 4,229,117
[45] Oct. 21, 1980

[54] APPARATUS FOR SECURING A METAL HOOP ONTO A METAL RIM

[75] Inventors: Roland Coppin, Marbaix-la-Tour; Andre Ghislain, Laneffe, both of Belgium

[73] Assignee: Ateliers de Constructions Electriques de Charleroi (ACEC), Charleroi, Belgium

[21] Appl. No.: 937,768

[22] Filed: Aug. 29, 1978

[30] Foreign Application Priority Data

Aug. 30, 1977 [BE] Belgium ................................. 18351

[51] Int. Cl.² .............................................. F16D 1/06
[52] U.S. Cl. ................................ 403/370; 301/13 R; 474/902
[58] Field of Search ............... 403/370, 371, 374, 368, 403/16; 74/230.5, 230.7; 301/19, 22, 23, 13 R

[56] References Cited

U.S. PATENT DOCUMENTS

| | | | |
|---|---|---|---|
| 1,299,463 | 4/1919 | Hecht | 301/22 |
| 1,400,442 | 12/1921 | Kilcullen . | |
| 3,023,035 | 2/1962 | Kelley | 403/16 |
| 3,210,104 | 10/1965 | Davis et al. . | |
| 3,590,652 | 7/1971 | Strang | 403/371 X |
| 3,805,550 | 4/1974 | Patton . | |
| 3,819,289 | 6/1974 | Carroll . | |
| 3,893,779 | 7/1975 | Schroeter | 403/370 |
| 4,090,822 | 5/1978 | Mount | 403/16 X |

FOREIGN PATENT DOCUMENTS

| | | |
|---|---|---|
| 2023316 | 12/1971 | Fed. Rep. of Germany . |
| 678406 | 12/1929 | France . |
| 977015 | 11/1950 | France . |
| 1241402 | 8/1960 | France . |

*Primary Examiner*—Andrew V. Kundrat
*Attorney, Agent, or Firm*—Schwartz, Jeffery, Schwaab, Mack, Blumenthal & Koch

[57] ABSTRACT

Apparatus for securing a metal hoop onto a metal rim is disclosed which apparatus includes two tightening collars integral with the rim, the collars and the metal hoop having conical shoulders and conical bores, each with the same angle of inclination, the conical shoulders being deformable by the action of the conical bores upon tightening the collars against the hoop so that no play remains between the hoop and the rim.

3 Claims, 4 Drawing Figures

APPARATUS FOR SECURING A METAL HOOP ONTO A METAL RIM

BACKGROUND OF THE INVENTION

The present invention concerns novel apparatus for securing a metal hoop to a metal rim.

According to prior art methods, a metal hoop may be mounted on a metal rim in the heated state, the metal hoop being broached to a diameter slightly smaller than the external diameter of the rim. In this manner, a good mechanical bond is obtained between the rim and the hoop, preventing any sliding between the two elements. Unfortunately, this operation requires special tooling and well defined conditions.

Similarly, a metal hoop secured in this manner to a metal rim can be removed only by special tooling of a different type.

The mounting and removal operations are thus not only involved, but also laborious. According to another mode of operation, a metal hoop is secured to a metal rim or shaft by a double system of truncated cones, which by means of tightening the inclined surfaces, exercises circumferential pressure on the cylindrical surfaces of the system of truncated cones.

Such a mode of securing a metal hoop to a metal rim has the disadvantage of excessive size.

According to the present invention, a novel method of securing a metal hoop to a metal rim is provided, said method affording ready mounting and removal regardless of the conditions under which such mounting or removal is to be performed.

SUMMARY OF THE INVENTION

According to the present invention, apparatus for securing a metal hoop to a metal rim, the metal hoop having a diameter slightly greater than the external diameter of the metal rim and being secured to said metal rim by two collars integral with said rim, comprises a metal hoop and the tightening collars having conical shoulders and conical bores, each with the same angle of inclination, and the conical shoulders are deformable by the action of the conical bores upon the tightening of the collars, thus securing the metal hoop on the metal rim with no play therebetween.

According to other characteristics of the invention, the mode of securing a metal hoop to a metal rim is also characterized by the hoop having a shoulder in the shape of a cone on one of its lateral faces and the two tightening collars being disposed at opposite ends of the rim and one of the collars having a bore in the shape of a cone corresponding to the conical shoulder of one of the laterial hoop faces and the other collar having a shoulder in the shape of a cone corresponding to the conical bore of the other lateral face of the hoop, whereby the two shoulders of the hoop and a shoulder of one of the collars are deformed under the action of the concurrent cones of the hoop and the collars.

The hoop is equipped on its two lateral faces with a shoulder in the shape of a cone and the rim is equipped with two tightening collars having a bore in the shape of a cone corresponding to the conical shoulders of the faces of the hoop, thereby to deform the two conical shoulders of the hoop under the action of concurrent cones of the hoop and the collars.

The hoop is equipped on its two lateral faces with a bore in the shape of a cone and the rim is equipped with two tightening collars having a shoulder in the shape of a cone corresponding to the conical bore of the faces of the hoop, thereby to deform the conical shoulders of the two collars under the action of the concurrent cones of the hoop and the collars.

BRIEF DESCRIPTION OF THE DRAWINGS

These objects as well as additional features and advantages of the present invention will become apparent to those skilled in the art as the description proceeds with reference to the accompanying drawings, wherein.

DESCRIPTION OF THE PREFERRED EMBODIMENT

Figure 1:
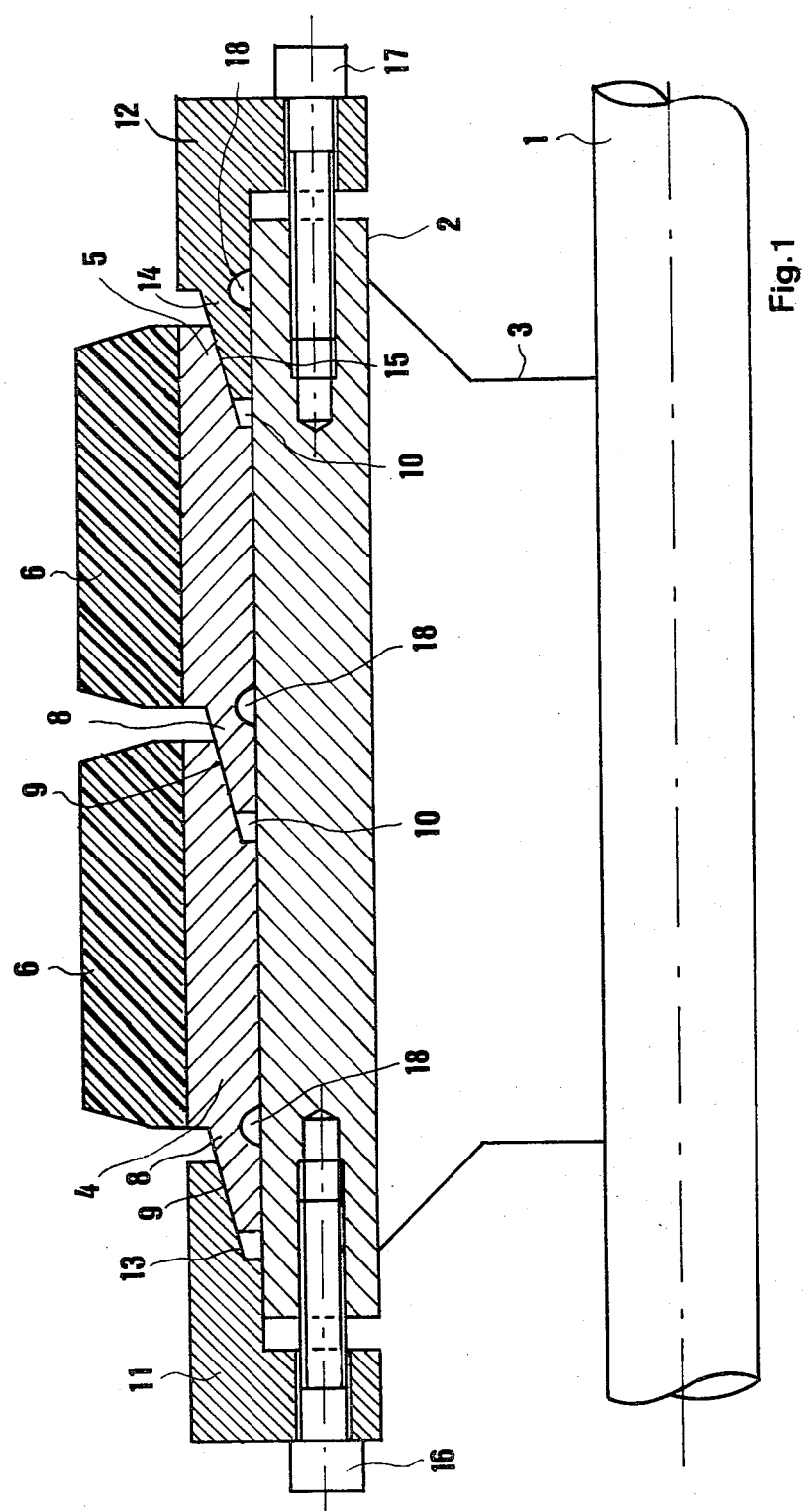
FIG. 1 shows apparatus for securing two metal hoops to a metal rim, each of the hoops having a conical shoulder and a conical bore.

Referring now to FIG. 1, the symbol 1 designates a shaft supporting a metal rim 2 by means of spokes 3. Two metal hoops 4 and 5, both carrying an elastic band 6, are to be secured to the rim 2.

Each of the hoops 4 and 5 are equipped, on one of their lateral faces, with a shoulder 8, the external surface of which forms a cone 9. On the other lateral faces of the hoops 4 and 5, a conical bore 10 is arranged, the inclination of said bore, with respect to the external surface of the rim 2, is identical with that of the cones 9.

The rim 2 is equipped at its two ends with two tightening collars 11 and 12. In the collar 11, a conical bore 13 is provided, the inclination of said bore being identical with that of the cone 9 of the shoulder 8 of the hoop 4.

At the other end of the rim 2, the tightening collar 12 is equipped with a shoulder 14, the external surface of which forms a cone 15 having an inclination identical with that of the bore 10 of the hoop 5.

The different pieces of the assembly having been arranged as indicated in the drawing, it is readily seen that by acting on the tightening screws 16 and 17, at first the conical parts 9 and 15 are placed into contact with the bores 10 and 13. An increase in the tightening force, by means of the action of the concurrent, conical surfaces of the hoops themselves, or of the hoops and the collars, will lead to the deformation of the shoulders 8 and 14, with the effect that said shoulders will be applied strongly against the external surface of the rim 2, thus assuring the transmission of mechanical forces without slippage between the rim 2 and the hoops 4 and 5, while permitting a certain amount of play between the external surface of the rim 2 and the internal surface of the hoops 4 and 5.

It is readily apparent that in this manner an extremely easy and sure method of mounting may be obtained, which does not require special tooling. In addition, the simplicity of this new mode of mounting also affords a rapid removal of the assembly.

Figure 2:
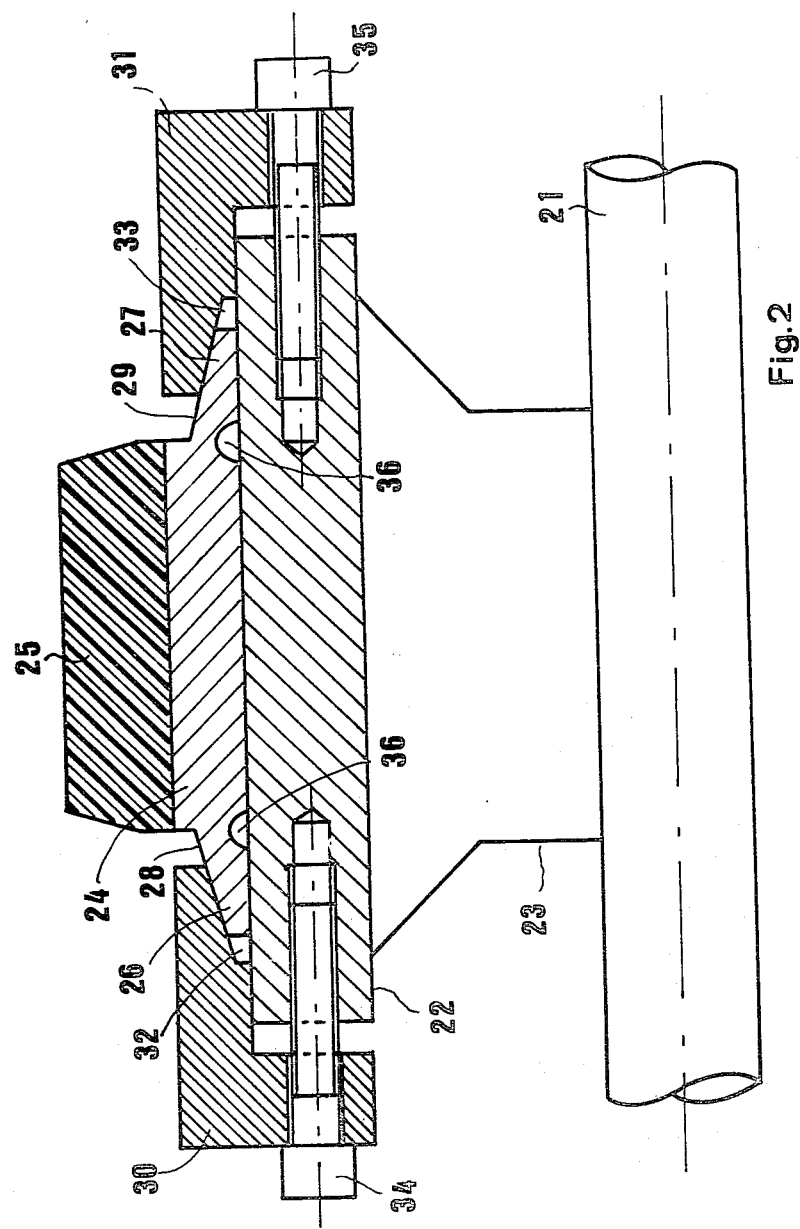
FIG. 2 shows apparatus for securing a metal hoop having two conical shoulders.

Referring now to FIG. 2, 21 designates a shaft supporting a metal rim 22 by means of spokes 23. A hoop 24, carrying an elastic band 25, is to be secured to the rim 22.

The hoop 24 is equipped, on its two lateral faces, with the shoulders 26 and 27, the outer surfaces of the latter forming the cones 28 and 29.

The rim 22 is equipped at its two ends with the tightening collars 30 and 31. In these two collars, the conical bores 32 and 33 are arranged, the inclination of said bores being identical with that of the cones 28 and 29 of the shoulders 26 and 27 of the hoop 24.

Having performed the assembly of the pieces as indicated in the drawing, it may be seen that by acting upon the tightening screws 34 and 35, the shoulders 26 and 27 are caused to be deformed, which will assure the transmission of mechanical forces without slippage between the rim 22 and the hoop 24.

Figure 3:
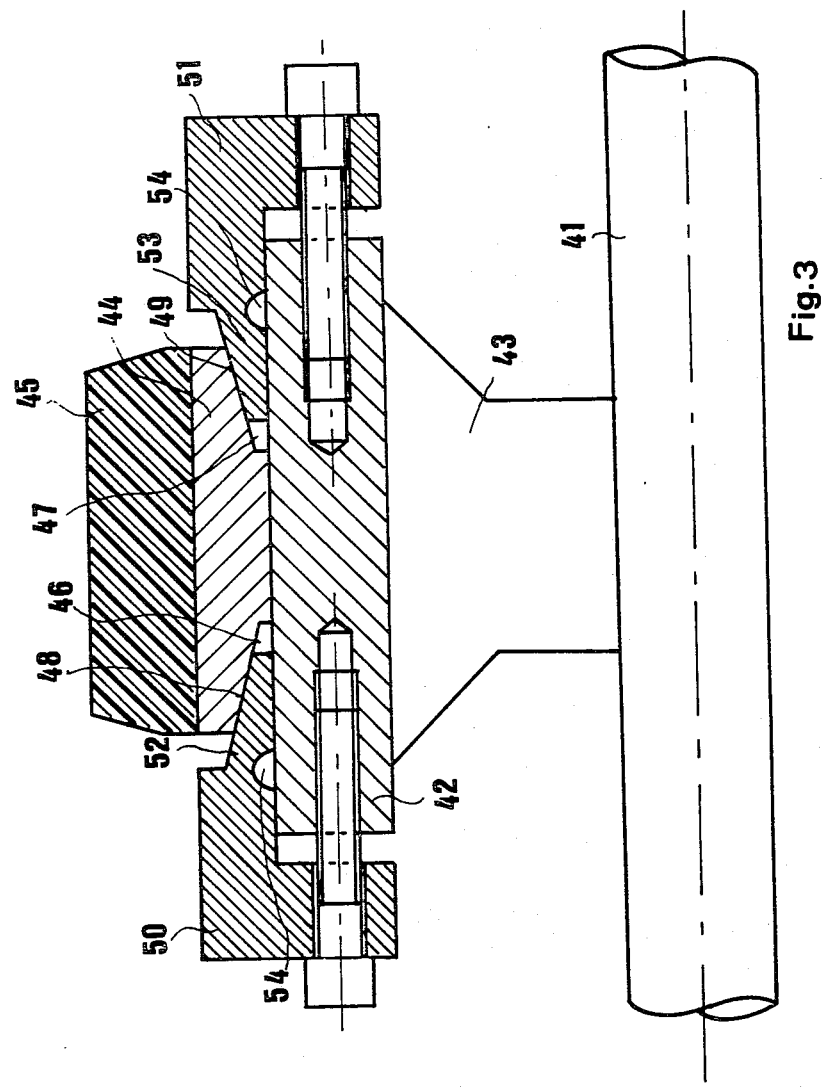
FIG. 3 shows apparatus for securing a metal hoop having two conical bores.

Referring to FIG. 3, 41 designates a shaft supporting a metal rim 42 by means of spokes 43. A hoop 44, carrying an elastic band 45 is to be secured to the rim 42.

The hoop 44 is provided, on its two lateral faces, with the bores 46 and 47, the external surface of which forms the cones 48 and 49.

The rim 42 is equipped at its two ends with the tightening collars 50 and 51. These two collars are equipped with the conical shoulders 52 and 53, the inclination of said collars being identical with those of the cones 48 and 49 of the bores 46 and 47 of the hoop 44.

The assembly of the pieces having been performed as indicated in the drawing, it is seen that by acting upon the tightening screws 54 and 55, the shoulders 52 and 53 are caused to deform, which will assure the transmission of mechanical forces without slippage between the rim 42 and the hoop 44.

Figure 4:
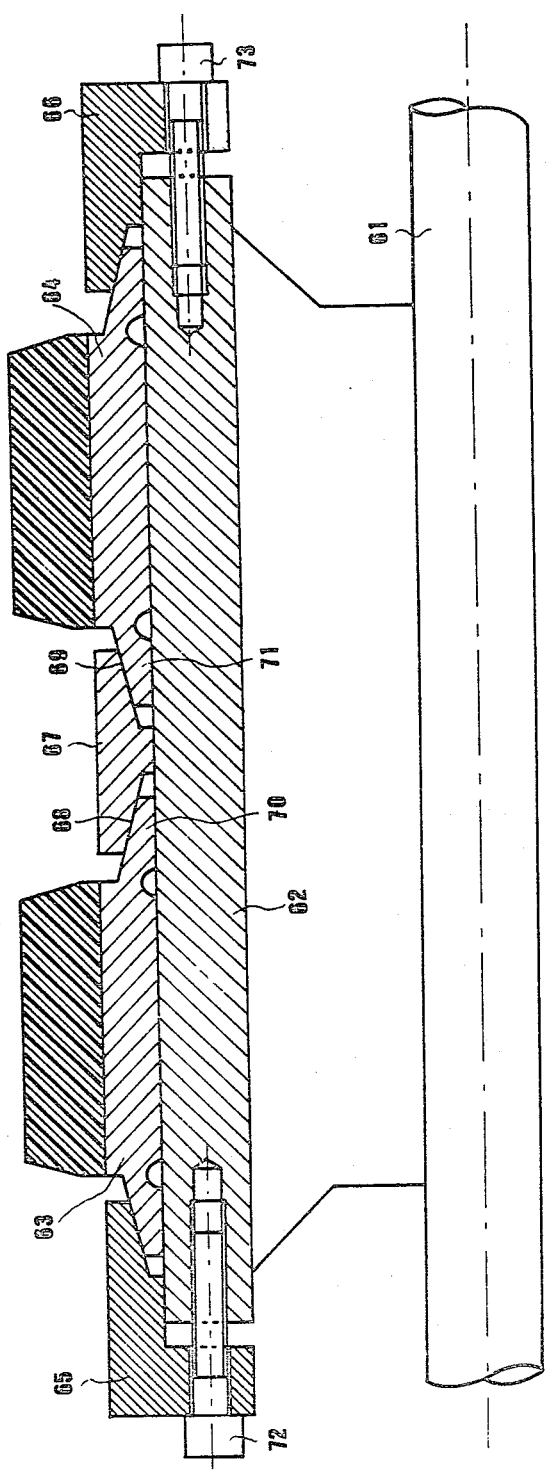
FIG. 4 shows apparatus for securing two metal hoops having two conical shoulders, with the interposition of an intermediate collar having two conical bores.

Because FIG. 4 of the drawings attached hereto is largely analogous to FIG. 2 of the drawings, the description to follow hereafter will be limited to the elements necessary for the understanding of the invention. Referring now to FIG. 4, 61 designates a shaft supporting a metal rim 62, intended to receive two hoops 63 and 64, equipped at their two lateral faces with shoulders, the external surfaces of which form cones. The mounting of the hoops and the blocking of the shoulders at the two ends of the rim 62 is performed in a manner identical to that disclosed in the description of FIG. 2, by means of tightening collars 65 and 66. The two hoops 63 and 64 are separated by an intermediate collar 67 which is provided on each of its faces, with a conical bore 68 or 69, corresponding to the conicity of the shoulders 70 and 71 provided on the hoops 63 and 64.

It is readily seen that by acting on the screws 72 and 73, not only the blocking of the sideplates 65 and 66 on the conical shoulders found at the ends of the rim 62, but also, the blocking of the bores 68 and 69 of the intermediate collar 67 against the conical shoulders 70 and 71 of the hoops is assured.

To enhance the flexibility of the shoulders provided on the hoops or the tightening collars, or on the intermediate collars, an internal annual groove, diminishing the resistance to flexing to the right of the grove, thus favoring the contact of the shoulders with the outer surface of the rim, may be provided at the base of the shoulder.

Such an internal, circular groove is shown in the drawings attached hereto, as reference 18 and FIG. 1, reference 36 in FIG. 2, reference 54 in FIG. 3 and reference 74 in FIG. 4.

Similarly, other variants of embodiment may be obtained in the case of hoops which exhibit on their opposite faces, a conical shoulder or a conical bore, respectively. It is still obvious, however, that the different variations that may be obtained in this manner are of a purely technical order and remain within the scope of the invention.

Thus, for example, when securing two metal hoops to the same metal rim, an intermediate collar equipped with two symmetrical shoulders may cooperate with the bores provided in the hoops, while said hoops, at their other face, will have shoulders cooperating with bores provided on the tightening collars.

What is claimed is:

1. An apparatus for securing a plurality of metal hoops to a metal rim, said metal rim adapted for supporting radial loads and having an axial direction, each metal hoop having an internal diameter slighly greater than an external diameter of said rim, each of said metal hoops having two sides with a conical shoulder on one side and a conical bore on the other side, said apparatus comprising conical clamping means for deformably clamping said metal hoops to said rim, said clamping means comprising at least two clamping collars, one of said collars having a conical shoulder and the other one of said collars having a conical bore, said plurality of hoops arranged slidably on said rim with said conical shoulders thereof extending in the same axial direction, said other one of said clamping collars arranged slidably on said rim and over the conical shoulder of one of said plurality of hoops and said one of said collars arranged slidably on said rim and with its conical shoulder extending in the same axial direction as said conical shoulders on said plurality of hoops, said clamping means further including means for connecting said collars to said rim and for drawing said collars axially towards said plurality of metal hoops.

2. The apparatus of claim 1 wherein said at least two collars comprise two collars disposed axially so as to clamp said plurality of metal hoops therebetween.

3. The apparatus of claim 1 wherein said conical shoulders of said metal hoops and said one of said collars have an internal surface adjacent said metal rim and include means for enhancing flexibility of said conical shoulders, said means for enhancing comprising an intermediate annular groove on said internal surface.

* * * * *